(12) United States Patent
Panesar et al.

(10) Patent No.: US 7,987,340 B2
(45) Date of Patent: Jul. 26, 2011

(54) COMMUNICATIONS IN A PROCESSOR ARRAY

(76) Inventors: Gajinder Panesar, Bristol (GB); Anthony Peter John Claydon, Bath (GB); William Philip Robbins, Bristol (GB); Alex Orr, London (GB); Andrew Duller, Bristol (GB)

(*) Notice: Subject to any disclaimer, the term of this patent is extended or adjusted under 35 U.S.C. 154(b) by 0 days.

(21) Appl. No.: 10/546,616

(22) PCT Filed: Feb. 19, 2004

(86) PCT No.: PCT/GB2004/000673
§ 371 (c)(1),
(2), (4) Date: Jul. 31, 2006

(87) PCT Pub. No.: WO2004/074963
PCT Pub. Date: Sep. 2, 2004

(65) Prior Publication Data
US 2007/0083791 A1    Apr. 12, 2007

(30) Foreign Application Priority Data
Feb. 21, 2003  (GB) .................................. 0304055.7

(51) Int. Cl.
*G06F 15/80* (2006.01)
(52) U.S. Cl. ........................................................ 712/16
(58) Field of Classification Search .............. 712/10–22; 710/117; 709/237
See application file for complete search history.

(56) References Cited

U.S. PATENT DOCUMENTS

| 4,698,746 | A |   | 10/1987 | Goldstein |
| 4,914,653 | A | * | 4/1990  | Bishop et al. ................. 370/462 |
| 5,410,723 | A |   | 4/1995  | Caesar et al. |
| 5,802,561 | A | * | 9/1998  | Fava et al. ..................... 711/120 |
| 5,826,033 | A | * | 10/1998 | Hayashi et al. ............... 709/238 |
| 5,951,664 | A |   | 9/1999  | Lambrecht et al. |
| 5,959,995 | A |   | 9/1999  | Wicki et al. |
| 6,424,870 | B1| * | 7/2002  | Maeda et al. .................... 700/4 |
| 7,161,978 | B2| * | 1/2007  | Lu et al. ........................ 375/219 |
| 2004/0078548 | A1 | * | 4/2004 | Claydon et al. .................. 712/1 |

FOREIGN PATENT DOCUMENTS
WO    WO 02/50624 A2    6/2002

OTHER PUBLICATIONS

PCT International Search Report, dated Dec. 2, 2004, in connection with International Application No. PCT/GB2004/000673.

(Continued)

*Primary Examiner* — William M Treat
(74) *Attorney, Agent, or Firm* — Potomac Patent Group PLLC (57) ABSTRACT

Data is transmitted from a sending processor over a network to one or more receiving processor in a forward direction during an allocated slot, and acknowledge signals are sent in a reverse direction during the same allocated slot, to indicate whether the receiving processor is able to receive data If one or more of the receiving processors indicates that it is unable to receive the data, the data is retransmitted during the next allocated slot. This means that the sending processor is able to determine within the slot period whether a retransmission is necessary, but that the slot period only needs to be long enough for one-way communication.

15 Claims, 6 Drawing Sheets

OTHER PUBLICATIONS

PCT Written Opinion, dated Dec. 2, 2004, in connection with International Application No. PCT/GB2004/000673.

International Preliminary Report on Patentability, dated May 3, 2005, in connection with International Application No. PCT/GB2004/000673.

Shiroshita, T. et al. "Reliable data distribution middleware for large-scale massive data replication" Parallel and Distributed Information Systems, 1996., Fourth International Conference on Miami Beach, FL, USA Dec. 18-20, 1996, Los Alamitos, CA, USA, IEEE Comput. Soc, US, Dec. 18, 1996, pp. 196-205, XP010213188 ISBN: 0-8186-7475-X.

Levine B. N. et al.: "A comparison of known classes of reliable multicast protocols" Network Protocols, 1996 International Conference on Columbus, OH USA Oct. 29-Nov. 1, 1996, Los Alamitos, CA USA, IEEE Comput. Soc. US. Oct. 29, 1996, pp. 112-121, XP010204425 ISBN: 0-8186-7453-9.

U.K. Search Report, dated Sep. 18, 2003, in connection with GB Application No. GB 0304055.7.

* cited by examiner

FIG. 6

COMMUNICATIONS IN A PROCESSOR ARRAY

This invention relates to a deterministic method of communicating information between processors in a network, and in particular to a multiprocessor system in which the processors communicate in accordance with the method.

WO02/50624 describes a processor array, in which a large number of processors are interconnected by a network of buses and switches. WO02/50624 also describes how to transfer data to processors in the array.

According to the present invention, there is provided a system in which data can be sent from a first processor to one or many receiving processors in accordance with a protocol for resending data if one or more of the receiving processors were unable to receive the data.

More specifically, data is transmitted from a sending processor to one or more receiving processor in a forward direction during an allocated slot, and acknowledge signals are sent in a reverse direction during the same allocated slot. As a result, the duration of the slot only needs to be long enough for data to travel in one direction.

This means that, compared with an alternative method, in which an acknowledge signal is sent only after it is known that data has been received, and in which the slot duration therefore needs to be long enough to allow for a round trip delay, the capacity of the bus is effectively doubled.

Further, compared with another method, in which receiving processors use a Ready signal to signify that they will be ready to receive data on the next allocated slot, slots are used more efficiently no slots are used merely to transfer the information that receiving processors will be ready to receive data on the next slot. Rather, data can be transferred during all available slots.

This has the advantage that it minimises the time that is consumed in resending.

For a better understanding of the present invention, reference will now be made by way of example to the accompanying drawings, in which:—

Figure 1:
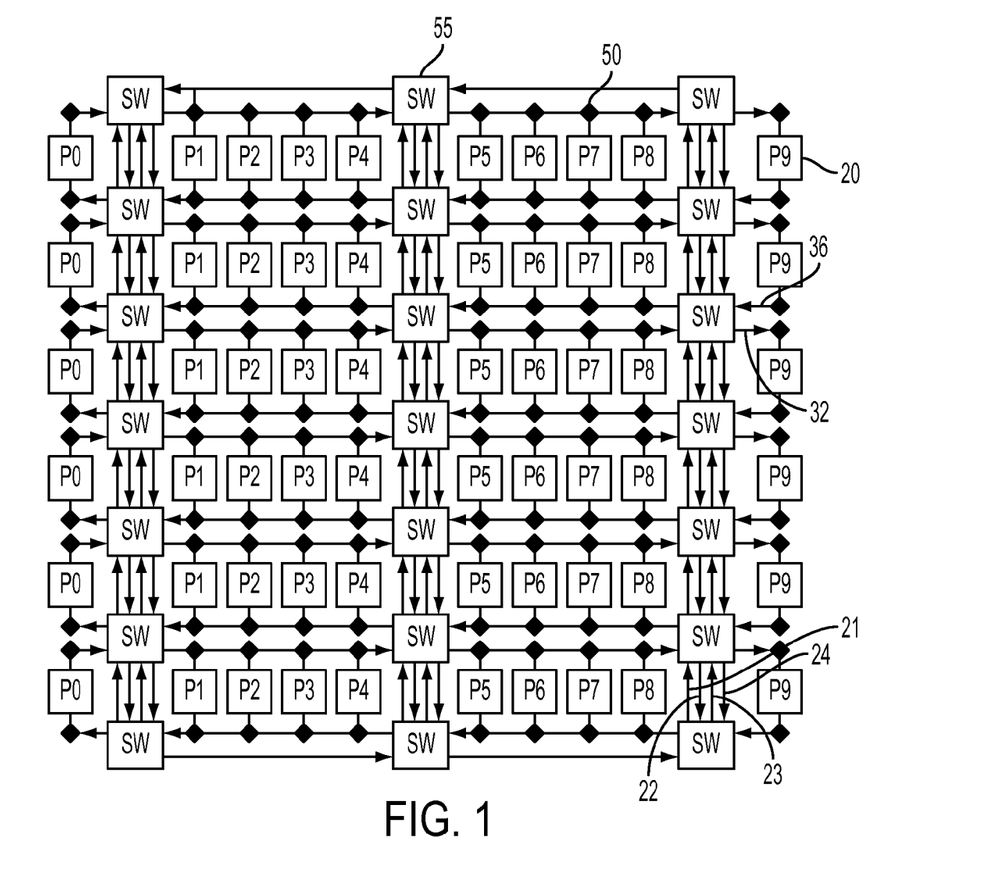
FIG. 1 is a block schematic diagram of a processor array in accordance with the present invention.

Referring to FIG. 1, a processor array of the general type described in WO02/50624 consists of a plurality of processors 20, arranged in a matrix. Although the invention is described herein with reference to an array of this type, it is equally applicable to other systems in which one processor is able to send data to multiple other processors over a network.

FIG. 1 shows an array having six rows, each consisting of ten processors, with the processors in each row numbered P0, P1, P2, . . . , P8, P9, giving a total of 60 processors in the array. This is sufficient to illustrate the operation of the invention, although one preferred embodiment of the invention has over 400 processors. Each processor 20 is connected to a segment of a horizontal bus running from left to right, 32, and a segment of a horizontal bus running from right to left, 36, by means of connectors, 50. These horizontal bus segments 32, 36 are connected to vertical bus segments 21, 23 running upwards and vertical bus segments 22, 24 running downwards at switches 55, as shown.

Each bus in FIG. 1 consists of a plurality of data lines, typically 32 or 64, a data valid signal line and two acknowledge signal lines, namely an acknowledge signal line and a resend acknowledge signal line.

Figure 2:
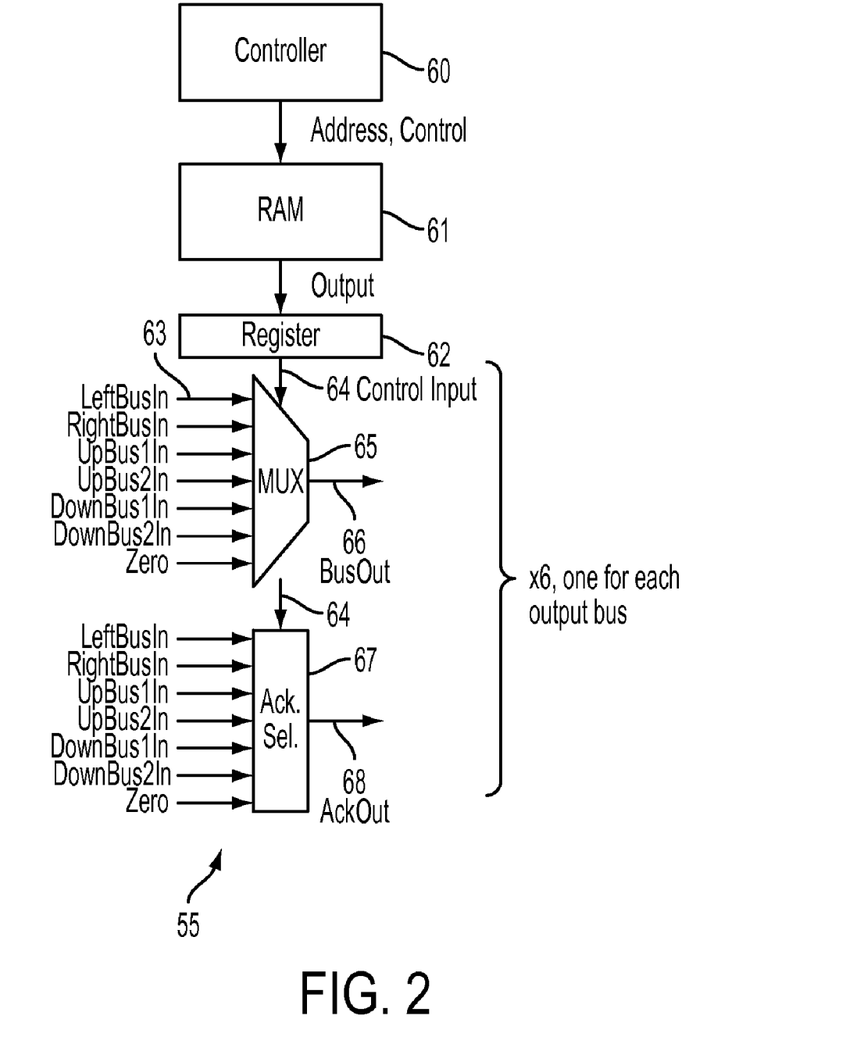
FIG. 2 is an enlarged block schematic diagram of a part of the processor array of FIG. 1.

The structure of each of the switches 55 is illustrated with reference to FIG. 2. The switch 55 includes a RAM 61, which is pre-loaded with data. The switch further includes a controller 60, which contains a counter that counts through the addresses of the RAM 61 in a pre-determined sequence. This same sequence is repeated indefinitely, and the time taken to complete the sequence, measured in cycles of the system clock, is referred to as the sequence period. On each clock cycle, the output data from RAM 61 is loaded into a register 62 determined The switch 55 has six output buses, namely the respective left to right horizontal bus, the right to left horizontal bus, the two upwards vertical bus segments, and the two downwards vertical bus segments, but the connections to only one of these output buses are shown in FIG. 2 for clarity. Each of the six output buses consists of a bus segment 66 (which consists of the 32 or 64 line data bus and the data valid signal line), plus lines 68 for output acknowledge signals Ack and resend acknowledge signals RAck.

A multiplexer 65 has seven inputs, namely from the respective left to right horizontal bus, the right to left horizontal bus, the two upwards vertical bus segments, the two downwards vertical bus segments, and from a constant zero source. The multiplexer 65 has a control input 64 from the register 62. Depending on the content of the register 62, the data on a selected one of these inputs during that cycle is passed to the output line 66. The constant zero input is preferably selected when the output bus is not being used, so that power is not used to alter the value on the bus unnecessarily.

At the same time, the value from the register 62 is also supplied to an acknowledge selection block 67, which receives acknowledge and resend acknowledge signals from the respective left to right horizontal bus, the right to left horizontal bus, the two upwards vertical bus segments, the two downwards vertical bus segments, and from a constant zero source, and selects a pair of output acknowledge signals on line 68.

Figure 3:
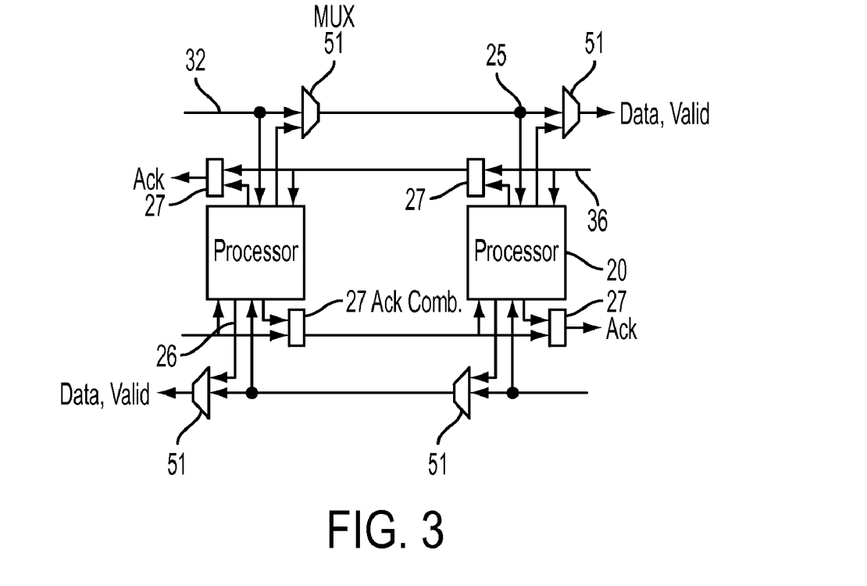
FIG. 3 is an enlarged block schematic diagram of another part of the processor array of FIG. 1.

FIG. 3 is an enlarged block schematic diagram showing how two of the processors 20 are connected to segments of the left to right horizontal bus 32 and the right to left horizontal bus 36 at respective connectors 50. A segment of the bus, defined as the portion between two multiplexers 51, is connected to an input of a processor by a connection 25. An output of a processor is connected to a segment of the bus through an output bus segment 26 and another multiplexer 51. In addition, acknowledge signals from processors are combined with other acknowledge signals on the buses in acknowledge combining blocks 27.

The select inputs of multiplexers 51 and blocks 27 are under control of circuitry within the associated processor.

All communication within the array takes place in a predetermined sequence. In one embodiment, the sequence period is 1024 clock cycles. Each switch and each processor contains a counter that counts for the sequence period. On each cycle of this sequence, each switch selects one of its input buses onto each of its six output buses. At predetermined cycles in the sequence, processors load data from their input bus segments via connection 25, and switch data onto their output bus segments using the multiplexers, 51.

As a minimum, each processor must be capable of controlling its associated multiplexers and acknowledge combining blocks, loading data from the bus segments to which it is connected at the correct times in sequence, and performing some useful function on the data, even if this only consists of storing the data.

Figure 5:
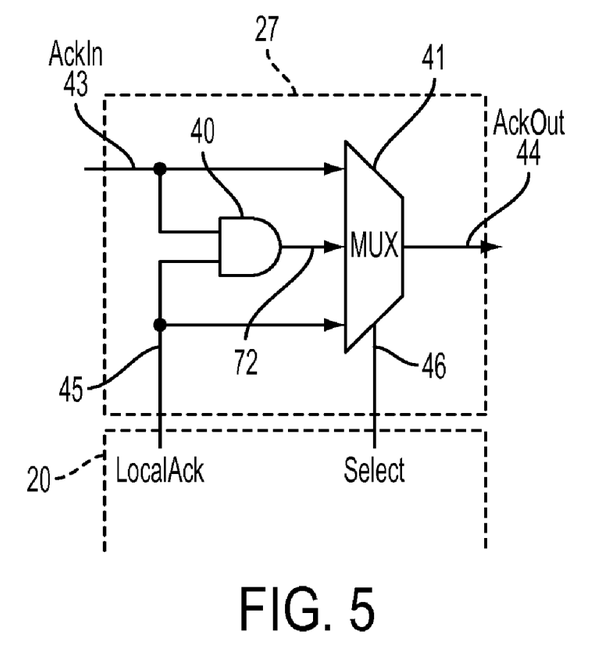
FIG. 5 is an enlarged block schematic diagram of a further part of the processor array of FIG. 1.

FIG. 5 shows in detail the structure of one half of one of the acknowledge control blocks 27, which, as shown in FIG. 3, are associated with each processor 20, the detail of the processor not being shown in FIG. 5.

The acknowledge control block 27 receives an input signal AckIn, which is the output signal from a preceding acknowledge control block 27, as an input on line 43. The processor 20 generates a local input signal LocalAck, and supplies this as another input for the acknowledge control block 27 on line 45.

The input signal AckIn, and the local input signal LocalAck, are supplied as inputs to a multiplexer 41, and are also supplied to an AND gate 40. The output of the AND gate 40 is supplied as a third input to the multiplexer 41 on line 72.

The processor 20 also generates a selection signal Select, which may actually be three bits, and supplies this on line 46 as a control input to the multiplexer 41 to select either the input signal AckIn, the local input signal LocalAck, or the logical AND of the input signal AckIn and the local input signal LocalAck. The selected one of these signals is supplied as an output signal AckOut on line 44, which is further supplied to any subsequent acknowledge control block 27 associated with any subsequent processor 20 connected to the same bus 32, 36.

FIG. 5 shows a part of the acknowledge control block 27, which can handle either the acknowledge signal Ack or the resend acknowledge signal RAck. In either case, the acknowledge control block 27 contains similar circuitry for handling the other of these two signals.

Figure 6:
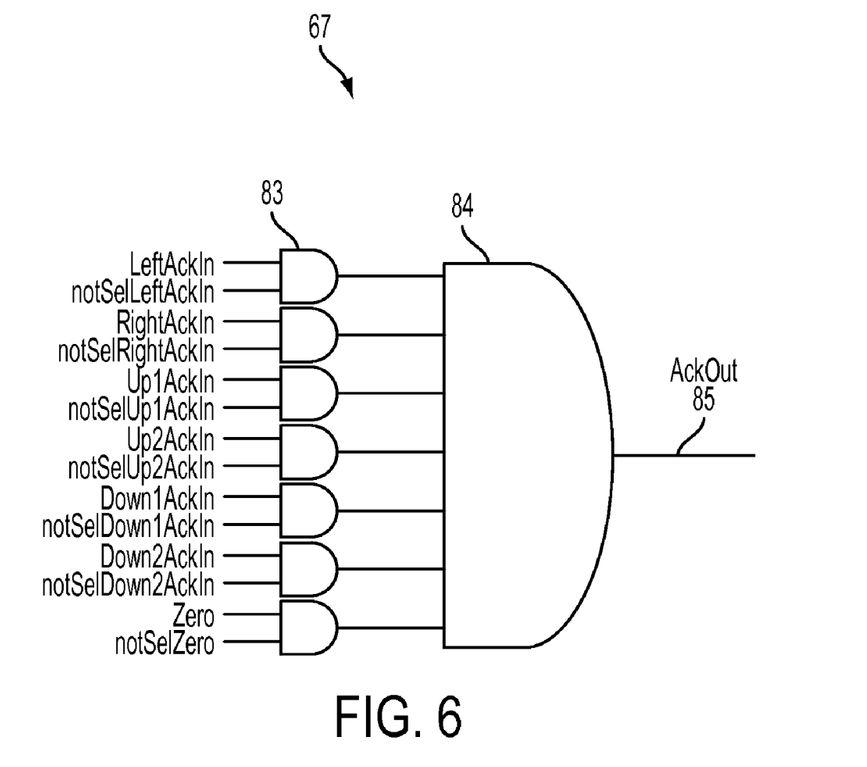
FIG. 6 is an enlarged block schematic diagram of a still further part of the processor array of FIG. 1.

FIG. 6 shows in more detail the structure of a part of the acknowledge selection block 67 within a switch 55, which is shown in, and briefly described with reference to, FIG. 2, and combines acknowledge signals. Again, FIG. 6 shows a part of the acknowledge selection block 67, which can handle either the acknowledge signal Ack or the resend acknowledge signal RAck. In either case, the acknowledge selection block 67 also contains similar circuitry for handling the other of these two signals.

Each of the input acknowledge signals, namely those on the respective right to left horizontal bus LeftAckIn, the left to right horizontal bus RightAckIn, the two upwards vertical bus segments UpAck1In and UpAck2In, and on the two downwards vertical bus segments DownAck1In and DownAck2In, and from the constant zero source Zero, is supplied to a first input of a respective AND gate 83.

The respective second inputs of these AND gates 83 each receive a signal which, in each case, is the inverse of the corresponding select signal received from the register 62. Thus, for any one of the input buses for which the select signal is 0, and only for such input buses, the output of the respective AND gate 83 is equal to the acknowledge signal.

The outputs of the AND gates 83 are connected to respective inputs of a further AND gate 84, such that the output function AckOut, is the logic AND of all the input acknowledge signals, for which the corresponding select signal, is low.

Data words may be sent from a first processor to one, second processor or from a first processor to a plurality of second processors at the same time. The operation of the device will be described first with reference to the case of data being sent from a processor to one other. In this description, it should be noted that all processors and all switches contain counters that are synchronized and are programmed to perform particular operations on each cycle of the sequence.

Referring to FIG. 3, the sending processor selects its local multiplexer 51, so that its output data and Valid signal are selected onto the selected horizontal bus. Appropriate switches 55 within the network are set to route the data and Valid signal from the sending processor to the receiving processor. The Valid signal is set high to indicate that there is valid data on the bus. At the end of the transfer period, the receiving processor loads the data if it is able to receive it.

At the same time as the sending processor selects data and the Valid signal onto the bus, the receiving processor determines whether it is able to receive the data, for example based on whether its data input buffer is full. Assuming that the receiving processor is able to receive data, it sets its LocalAck signal high and selects it onto the bus as described with reference to FIG. 5, by means of the multiplexer 41. If the receiving processor is unable to receive the data, it sets its LocalAck signal low, and selects this onto the bus in the same way.

In either case, the acknowledge signal is sent by the receiving processor before it actually receives the transmitted data.

The LocalAck signal, set onto the bus by the receiving processor, is routed back through the appropriate switches 55 to the sending processor. Within each of the switches, the select signals on lines 64 (shown in FIG. 6) are set low for the AND gate 83 (shown in FIG. 6) corresponding to the wanted acknowledge signals and are set high for all other acknowledge signals. At the end of the transfer period, the sending processor samples the acknowledge signal, which has been routed back in this way.

The action taken by the sending processor depends on whether the sampled acknowledge signal Ack was high or low. If it was high, the receiving processor was able to receive the data, and, on the next cycle that is allocated to this particular communication channel (slot), the sending processor is able to send new data. If the sampled acknowledge signal is low, the receiving processor was unable to receive the data, and, in the next slot, it sends the data again. This time, the sending processor sends the data in the same way as before, but sets the Valid signal low.

As the receiving processor did not load the data on the previous slot, if it is now able to receive data it loads it, and during the same slot, it sets its resend acknowledge signal RAck high. The high RAck signal informs the sending processor that the data was received and the transfer is now complete. If the receiving processor is still unable to receive the data, it sets its RAck signal low, and the sending processor will send the data again in the next allocated slot. This process continues until the receiving processor is able to receive the data.

Figure 4:
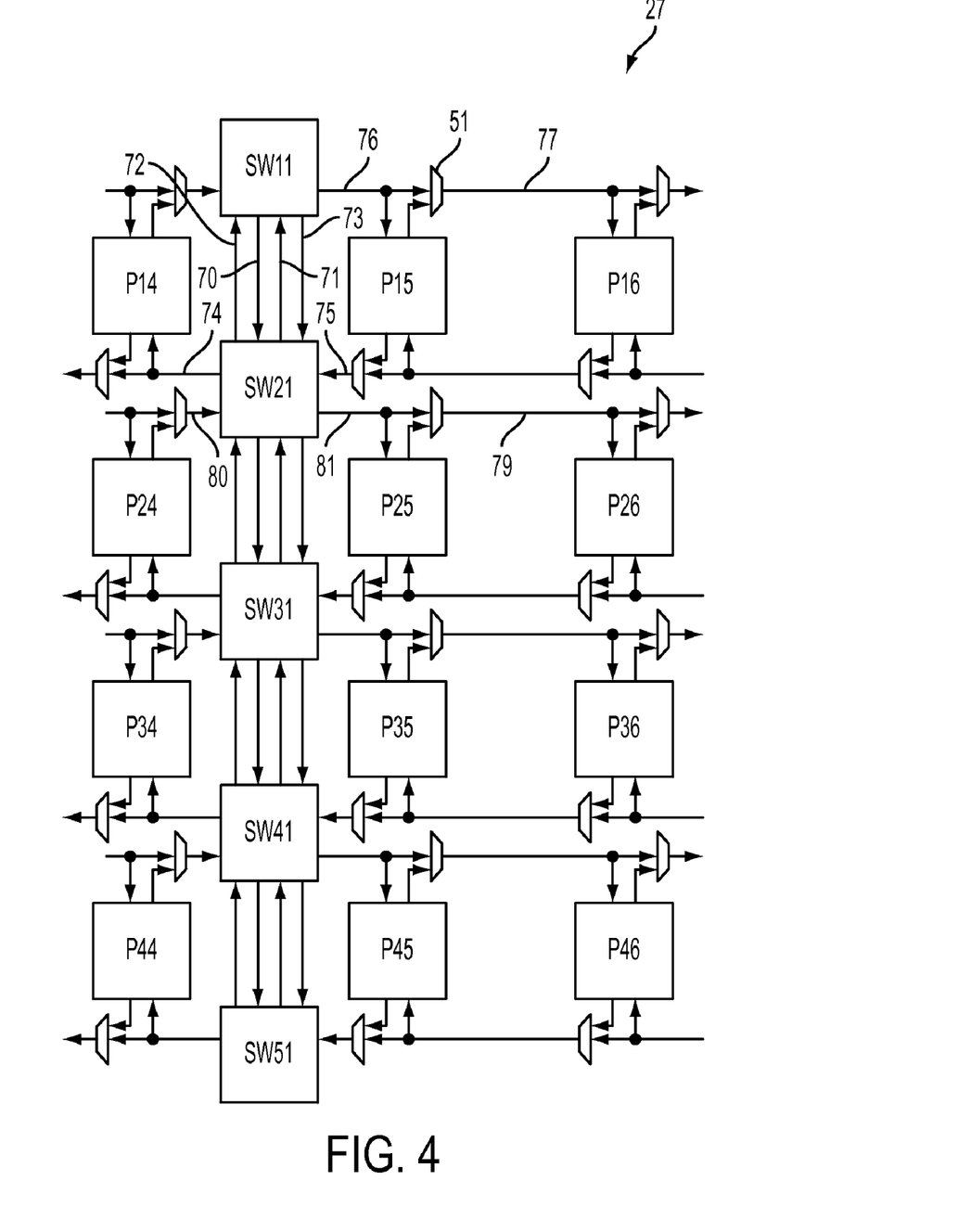
FIG. 4 is an enlarged block schematic diagram of a further part of the processor array of FIG. 1.

By way of example, referring to FIG. 4, consider the transfer of data from processor P24 to processor P16. In the slot in which the transfer takes place, processor P24 selects its output data and Valid signals onto bus segment 80, using its local multiplexer. The switch SW21 is set so that data on the input RightBusIn from the left to right horizontal bus segment 80 is routed to the output UpBus1Out for the upwards vertical bus segment 72, and the corresponding Ack signals are routed in the opposite direction. The switch SW11 is set so that data on the input UpBus1In from the upwards vertical bus segment 72, is routed to the output RightBusOut to the left to right horizontal bus segment 76, again with the corresponding Ack signals being routed in the opposite direction.

The processor P15 can not use this latter bus segment during this slot (although it should be noted that it can use the appropriate right to left bus segment if it requires to transfer data at this time). Rather, the multiplexer 51, which connects the processor P15 onto the left to right bus, is set to route the data on the bus segment 76 through to the bus segment 77. At the end of the transfer period, the receiving processor P16 then loads the data and Valid signals, and the sending processor P24 samples the Ack and Rack signals.

The invention will be further illustrated with reference to the case where data is sent to more than one receiving processor. For example, again referring to FIG. 4, the sending processor P24 sends data to three receiving processors P16, P25 and P26.

Switches S21 and S11 are set as before, but switch SW21 is additionally set to route data on the input RightBusIn from the left to right horizontal bus segment 80 to the output RightBusOut to the left to right horizontal bus segment 81. The processor P25 controls its local multiplexer on the left to right bus to route data from bus segment 81 to bus segment 79. The switch SW11 and the processors P15 and P16 behave as before, and, at the end of the transfer period, the processors P16, P25 and P26 all load data and sample the Valid signal, if they are able to receive data on that slot.

The acknowledge control block, that is controlled by processor P25, between the left to right bus segments.81, 79, is set to select the AND of the LocalAcks (Ack and RAck) from that processor P25. The inputs AckIn for the acknowledge control block on bus segment 79, and the acknowledge select signals in the switch SW21, are set so that the acknowledge signals on the bus segment 80 are the logical AND of the acknowledge signals from the bus segments 72 and 81.

In this way, the acknowledge signals sampled by the sending processor P24 are the logical AND of the acknowledge signals from the receiving processors P16, P25 and P26. On the first slot that a particular data word is sent, if all three receiving processors were able to load the signal, then the Ack signal sampled by the sending processor P24 will be high, and it will be able to transfer new data on the next allocated slot. If on the other hand this sampled Ack signal is low, the sending processor P24 resends data in the next allocated slot, with the Valid signal low, as described above.

In that case, if any of the receiving processors P16, P25 and P26 received the data on the previous allocated slot, they will sample the low Valid signal, which will indicate to them that there is no new data being transferred in that slot. However, any of the receiving processors P16, P25 and P26 that have not already received the data, and are able to receive it in this slot, will load the data.

All processors control their resend acknowledge signal RAck as follows: if they received data in the previous allocated slot, they set the resend acknowledge signal RAck high, regardless of whether they can receive data in the current slot. If they were unable to receive data on the previous allocated slot, they set RAck high if they are able to receive the data in the current allocated slot, and they set RAck low if they are not able to receive the data.

In this example, if processors P16 and P25 were able to receive data on the first slot, but processor P26 was not, then processor P24 will sample Ack low and resend the data on the next allocated slot. On this next slot, processors P16 and P25 will set their RAck signals high. If processor P26 is not able to receive data on the second slot either, it will set RAck low at that time. The sending processor P24 will sample RAck low, and will send the data yet again, in a third allocated slot. If, in the third slot, the receiving processor P26 is able to receive data, it will set RAck high; P16 and P25 will again have set their RAck signals high and P24 will sample the high RAck, indicating that the transfer is complete. New data can then be transferred on the next allocated slot.

In an embodiment of the invention, processors have input buffers, and a processor may be unable to receive data because its input buffer is full. Using this method, receiving processors are using the acknowledge signal Ack and the resend acknowledge signal RAck to signal whether they will be able to load the data at the end of the slot.

The invention has been described in terms of a particular embodiment, but it is generally applicable to circumstances where one processor needs to send data to one or more other processors. These processors may be addressed by information in a packet header, for example, rather than the data being switched by pre-programmed switches. In all cases the present invention can provide the advantage that receiving processors can acknowledge that they are able to receive data during the same time slot that data is sent, while advantageous embodiments of the protocol can guarantee that receiving processors do not receive the same data (or data packet) more than once.

The invention claimed is:

1. A processor system, comprising:
a plurality of processors; and
a network interconnecting said processors,
wherein at least one transmitting processor is programmed to transmit data to a plurality of receiving processors during predefined time periods, and wherein the receiving processors are programmed to receive the transmitted data during said predefined time periods,
wherein, during said predefined time periods at which the plurality of receiving processors are programmed to receive the transmitted data and at the same time as said at least one transmitting processor is programmed to transmit said data, said receiving processors are programmed to transmit an acknowledge signal to the respective transmitting processor, indicating whether they are able to accept the transmitted data,
wherein the acknowledge signals from said plurality of receiving processors are combined into a combined acknowledge signals which indicates whether or not all of said plurality of receiving processors were able to accept the transmitted data;
wherein each transmitting processor is programmed to detect the combined acknowledge signal and, in the event that the combined acknowledge signal indicates that not all of said receiving processors were able to receive said transmitted data, to retransmit said data to all of said plurality of processors during a next predefined time period; and
wherein said transmitting processor is programmed such that when said combined acknowledge signal indicates that all receiving processors were able to accept the data then said is not retransmitted.

2. A system as claimed in claim 1, wherein said network interconnecting said processors comprises a data valid line connection and wherein each processor is programmed to transmit, with any data, a binary data valid signal on said data valid line connection, indicating whether or not the data has previously been transmitted.

3. A system as claimed in claim 1, comprising logic circuitry associated with each processor for forming said combined acknowledge signal, wherein said combined signal is a logical AND of the acknowledge signals transmitted by each receiving processor to the associated transmitting processor.

4. A system as claimed in claim 1, wherein each processor has a data input buffer, and each receiving processor transmits an acknowledge signal, indicating that it is unable to receive data, in the event that the respective input data buffer is full.

5. A system as claimed in claim 2, wherein each receiving processor is programmed, in the event that it transmits an acknowledge signal to the respective transmitting processor indicating that it is unable to accept the transmitted data in a first predefined time period, to transmit a resend acknowledge signal to the transmitting processor during the next predefined time period, indicating whether it is able to receive the retransmitted data;

wherein in the event that it transmits an acknowledge signal indicating that it is able to accept data in said first predefined time period and, in the next predefined time period said binary data valid signal indicates that the data has previously been transmitted, to transmit a resend acknowledge signal to the transmitting processor during the next predefined time period, indicating that it has been able to receive the retransmitted data; and wherein the resend acknowledge signals from said plurality of receiving processors are combined into a combined resend acknowledge signal which indicates whether or not all of said plurality of receiving processors have been able to accept the re-transmitted data.

6. A system as claimed in claim 5, wherein each transmitting processor is programmed to detect the combined resend acknowledge signal and, in the event that not all of said receiving processors were able to receive the retransmitted data, to retransmit said data again during the next predefined time period.

7. A system as claimed in claim 6, wherein each processor has a data input buffer, and each receiving processor unable to receive the data in the first time period transmits a resend acknowledge signal, indicating that it is unable to receive retransmitted data, in the event that the respective input data buffer is full and each receiving processor which was able to receive the data in the first time period transmits a resend acknowledge signal, indicating that it is able to receive retransmitted data, irrespective of the status of the respective input data buffer.

8. A system as claimed in claim 1, wherein each processor is programmed to perform a predetermined sequence of operations repetitively in successive sequence periods.

9. A system as claimed in claim 1, wherein the network comprises a network of buses and switches, and wherein the switches are programmed to transfer the data from the transmitting processor to the plurality of receiving processors, and to transfer the respective acknowledge signal from each of the plurality of receiving processors to the transmitting processor, during the predefined time periods.

10. A system as claimed in claim 2, wherein said binary data valid signal takes a first value when transmitting data which has not previously been transmitted, and which takes a second value when transmitting data which has previously been transmitted and wherein said binary data valid signal line is also set to said second value when not transmitting valid data.

11. A system as claimed in claim 1 wherein said combined acknowledge signal is a binary signal.

12. A system as claimed in claim 1 wherein each receiving processor is programmed such that if it transmits an acknowledge signal indicating that it was able to accept data in a first predefined time period no further acknowledge signal is transmitted in a subsequent predefined time period unless the data is retransmitted.

13. A system as claimed in claim 1 wherein the time between start of a first said predefined time periods and a second said predefined time period is shorter than the time required for a round trip of data transfer from the transmit processor to at least one receive processor and subsequent data transfer from said receive processor back to the transmit processor.

14. A processor array, comprising:
   a plurality of processors, able to act as sending processors and receiving processors; and
   a network interconnecting said processors, wherein
      when a sending processor is programmed to transmit data to a receiving processor over the network and the receiving processor is programmed to receive the transmitted data from the sending processor during a first predefined time period, and
      the receiving processor is programmed to transmit an acknowledge signal to the sending processor during said first predetermined time period at the same time that the sending processor is programmed to transmit said data, indicating whether it will be able to accept the transmitted data during said first predefined time period, and
      the sending processor is programmed to detect the acknowledge signal transmitted by the receiving processor, wherein further
         if the acknowledge signal indicates that the receiving processor was able to accept said transmitted data during said first predefined time period, no further acknowledge signal is sent;
         if the acknowledge signal indicates that the receiving processor was unable to accept said transmitted data during said first predefined time period, the sending processor is programmed to retransmit said data to the receiving processor during a second predefined time period immediately following the first predetermined time period and to transmit with the retransmitted data a data valid signal indicating that the data has previously been transmitted, and the receiving processor is programmed to transmit a resend acknowledge signal to the sending processor during said second predefined time period, indicating whether it will be able to accept the retransmitted data during said second predefined time period.

15. A processor array as claimed in claim 14, wherein the sending processor is programmed to detect the resend acknowledge signal transmitted by the receiving processor and, in the event that the resend acknowledge signal indicates that the receiving processor was unable to accept the retransmitted data, to retransmit said data during a third predefined time period immediately following the second predefined time period.

* * * * *